United States Patent [19]

White et al.

[11] Patent Number: 4,974,106

[45] Date of Patent: Nov. 27, 1990

[54] NON-CONTACT MAGNETIC HEAD ASSEMBLY FOR A FLEXIBLE MEDIUM DISK DRIVE

[76] Inventors: James W. White, 135 Olive Ave., Los Gatos, Calif. 95030; Anil K. Nigam, 1103 Elmsford Dr., Cupertino, Calif. 95014

[21] Appl. No.: 354,619

[22] Filed: May 19, 1989

[51] Int. Cl.⁵ .............................................. G11B 5/60
[52] U.S. Cl. .................................... 360/102; 360/103
[58] Field of Search ................................. 360/102-104

[56] References Cited

U.S. PATENT DOCUMENTS

| | | | |
|---|---|---|---|
| 3,398,870 | 8/1968 | Mullan | 360/103 X |
| 4,151,573 | 4/1979 | Tandon et al. | |
| 4,315,292 | 2/1982 | Kronfeld | 360/104 X |
| 4,414,592 | 11/1983 | Losee et al. | |

Primary Examiner—A. J. Heinz
Attorney, Agent, or Firm—Fliesler, Dubb, Meyer and Lovejoy

[57] ABSTRACT

Opposed magnetic head sliders 22, 24 for dual sided recording on a flexible disk 26 include one or more slots 32 provided longitudinally in one of the opposed rails in order to allow the slotted rail 28 to fly and reduce flying height relative to a flexible disk 26 operating at an elevated rotational speed. The sliders additionally have a diagonally blended contour 96 for urging contaminants away from the film interface between the head sliders 22, 24 and the flexible disk 26.

36 Claims, 11 Drawing Sheets

TOP RAIL

TOP RAIL

BOTTOM RAIL (SLOTTED)

NON-CONTACT MAGNETIC HEAD ASSEMBLY FOR A FLEXIBLE MEDIUM DISK DRIVE

FIELD OF THE INVENTION

The present invention relates to disk drive heads.

BACKGROUND OF THE INVENTION

One sided flexible disk recording is typically performed with a read/write (R/W) "button head" penetrated into the plane of the disk and opposed by a pressure pad of soft material. The R/W head and pressure pad are nominally in contact with the flexible disk. Low rotational speed (such as 360 RPM) serve to minimize wear to the contacting surfaces.

Dual side flexible disk recording utilizes recording heads that are generally directly opposed. Usually, one magnetic head slider is fixed normal to the plane of the disk. The opposite slider is typically gimbal mounted to a support arm and is lightly loaded toward the disk and fixed head slider. At low rotational speeds, a nominally contact condition occurs between slider and disk on both sides of the disk. Due to the low speed, the amount of head and disk wear is controlled to an acceptable level. Such an arrangement is described by Tandon, et al. in U.S. Pat. No. 4,151,573.

For one-sided flexible disk recording, the extension to higher rotational speed (such as 1500 RPM) has been accomplished by Losee and Norton (U.S. Pat. No. 4,414,592). A Bernoulli principle is used to control the disk position relative to a rigid backing plate. The air bearing design consists of a multi-slotted convex (to the disk) head section protruding slightly above the plane of a flat circumferential surface (described by Losee and Norton as a coupler) which itself is penetrated into the plane of the disk. The outer portion of the coupler is beveled to allow control of the disk motion and to minimize wear and impact damage between disk and coupler. The coupler section serves to stabilize and position the disk relative to the slotted convex head section. The slotted head contour produces a very low clearance, nominally non-contact condition, at the magnetic transducer. The Losee and Norton slider patent is not a simple extension of an already existing slider configuration. It has a complicated geometry and requires rather tight geometric tolerancing for manufacture.

SUMMARY OF THE INVENTION

There is currently no single or dual sided head configuration which allows the use of high rotational speeds (such as 3000 RPM, and above, with a 3.5 inch disk) with a flexible media disk drive. Any air bearing slider design that promotes a nominal contact condition at high speeds will produce unacceptable levels of wear at the head/disk interface. The use of current opposed head configurations at high speeds will generally result in unacceptable high flying heights over the magnetic transducer.

The current invention provides for both single and dual sided head configurations for reading and writing at elevated rotational speeds. The current invention includes a head having a slotted air bearing on one side of the disk, opposed by a hydrodynamic pressure pad (HPP) on the other side of the disk. Instead of having head/disk contact as in prior devices, the slider arrangement of the present invention causes the head and the HPP to fly above the adjacent surface of the disk. This flying height greatly minimizes wear due to contact, and reduces the chance of head failure due to contaminating particles coming between the head and the disk. Further, instead of having the head penetrated into the plane of the disk, in the present arrangement, the HPP and slotted head in combination allow a low clearance non-contact flying height profile with little or no head penetration. There is a pressurized film developed between both the slotted head and the HPP, which defines the flying height. This film is greater on the side of the HPP and lesser on the side of the slotted head due to the pressurized air flow bleeding off through the slots. The pressure on both sides of the disk is generally equalized with the result that the air film thickness adjacent to the HPP has pushed the disk toward the slotted head, and the air film thickness adjacent to the slotted head has reduced, drawing the disk toward the slotted head. The air film adjacent to the HPP is thicker and thus less stiff and more springy than the thinner, more stiff and less springy air film adjacent the slotted head. Being more forgiving of contamination, this arrangement allows the disk to flex away from the head should contaminating particles come between the head and the disk, due to the greater springiness of the air film adjacent the HPP.

Thus, by developing a nominally non-contact very low clearance flying height, the present invention allows a flexible media disk drive to operate at the speed and capacity of a hard media disk drive.

In addition to use of a single transducer per slider, the present invention allows for both a high density transducer and a low density transducer to be mounted in the same slider. The invention allows the slider to operate optimally with the low density transducer flying relatively higher above the disk and the high density transducer flying relatively lower above the disk.

A further object of the invention includes a slider with a diagonal contour to cause potentially contaminating particles to be urged out of the way of the slider.

DETAILED DESCRIPTION OF THE PREFERRED EMBODIMENT

Figure 1:
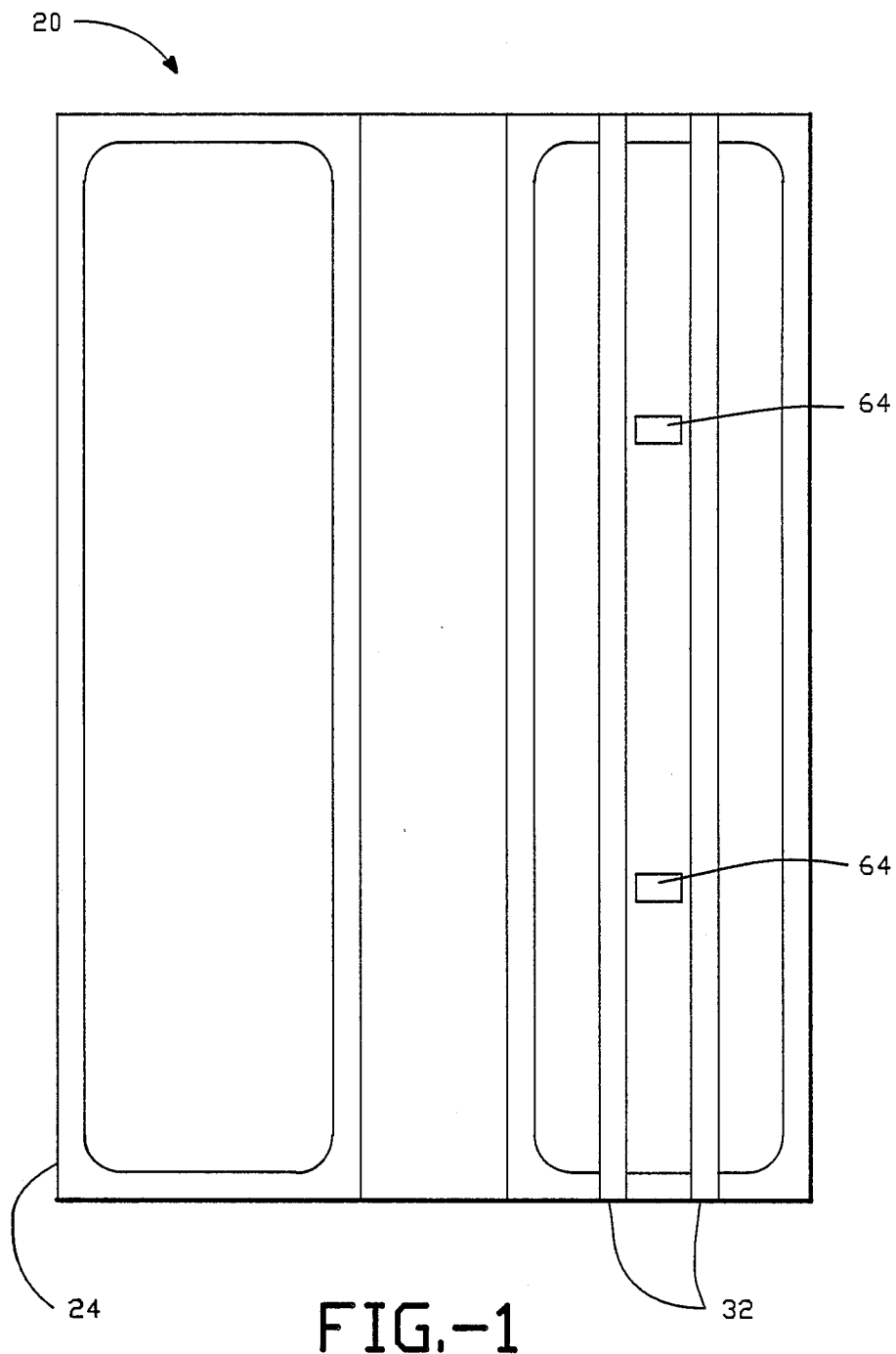
FIG. 1 depicts an embodiment of a head slider of the invention.

The present self acting air bearing head slider configuration 20 of the invention (FIG. 2) utilizes opposed magnetic head sliders 22, 24 (typically two rail sliders) for dual sided recording on a flexible disk 26. One slider 22 (the bottom slider) is maintained at a fixed (or gimbal mounted with a relatively stiff suspension) position normal to the plane of the disk 26, even though the slider moves to different positions over the surface of the disk 26. The opposite slider 24 (the top slider) is gimbal mounted 27 to a support structure 29 which support structure 29 is movable toward and away from the plane of the disk 26. An applied load 31 of the support structure 29 urges the top slider 24 toward the disk 26 and the disk 26 thus becomes positioned in relative proximity to both sliders 22, 24. Rail 28 of the top slider 24 contains at least one (and in a preferred embodiment generally two or more) longitudinal 32 slot which is deep enough (generally at least as deep as the slot is wide in a preferred embodiment) to insure the presence of ambient pressure in the slot 32.

The second rail 30 of the top slider 24 is unslotted. Each of these two rails 28, 30 is opposed on the other side of the disk 26 by a rail unlike itself. That is, the unslotted rail 30 is opposite a slotted rail 34 of bottom slider 22 and the slotted rail 28 is opposite an unslotted rail 36 of bottom slider 22. For each slider 22, 24, the unslotted rail 30, 36 functions as a hydrodynamic pressure pad (HPP). The combination of the HPP and opposite slotted rail 28, 34 function as follows: air bearing pressure and load support between the sliders 22, 24 and disk 26 is developed by the relative motion between sliders 22, 24 and disk 26 and by the "wedge effect" created by the non-parallel orientation between the sliders 22, 24 and disk 26.

This orientation is augmented by a blended slider inlet section, crown on the flat slider (or rail) surface (surface convex to the disk in the direction of relative motion) and by a localized application of the external force to the top slider. Due to the global flexibility of the disk 26 normal to its plane 44, the disk 26 offers little transverse resistance to pressure loading over fairly wide areas. The disk 26 will position itself, relative to its own plane 44 so as to produce a condition of force and moment equilibrium for static flying operation. Over the unslotted rails 30, 36, the pressure tends to be fairly uniform and the slider-to-disk clearance, or flying height 46 is considerably higher than the flying height 48 which will be developed over the slotted rails 28, 34. Over the slotted rail 34, the influence of the slots 52 is to receive and convect away pressurized air flow from adjacent air bearing sections. This allows the flying height 48 of slotted rail 34 below the disk 26 to occur in equilibrium at substantially lower values than the flying height 46 of the unslotted side 30 above disk 26.

In order to operate in an optimally nominal non-contact orientation, the widths of the slots 32, 52 must be narrow enough to avoid head/disk contact along the slot edges (such as 54, 56). This requires that over the width of the slot 32, 52 the bending properties of the disk 26 must support the disk 26 against the pressure loading from the unslotted side 30. The requirement then is that the slot width be at most only a few times wider than the disk thickness. In addition, a slight amount of edge blending(or rounding) along the slot edges 54, 56 is also helpful in minimizing wear through disk 26 and slot edge 54, 56 contact.

The result is that much higher velocities (high rotational speeds) can be utilized which produce required nominally non-contact low flying heights over the respective magnetic transducers on rails 28, 34. In order to position and control the passage of the disk 26 with minimum wear between the opposing sliders 22, 24, each slider 22, 24 has an air bearing contour in a preferred embodiment, such as the contour of air bearing head slider configuration 20, blended along the outside edges (front, rear, side edges and corners) so as to produce a convex surface on rail 34 relative to the plane of the disk.

Another advantage due to the presence of the HPP concerns the passage of submicron sized particles 50 (such as wear particles) through the region of the head slider configuration 20. Because the unslotted rail 30, 36 produces a considerably higher flying height 46 than the slotted section rail 28, 34, the resulting air bearing stiffness of the unslotted air film 60 adjacent the unslotted rail 30, 36 is considerably less than the air bearing stiffness of the slotted air film 62 of the slotted rail 28, 34. This characteristic causes the surface of the disk 26 to locally deform to allow convective passage of submicron sized particles through air film 62 adjacent the slotted rail 34. The air film 60 adjacent the unslotted rail 30 offers little resistance as the disk 26 dynamically translates away from the surface of the slotted rail 34 to enlarge the air flow area of the air film 62 and to allow particle passage. Solid particles, due to the thicker air film 60 adjacent unslotted rail 30 will be readily convected therethrough due to the larger air flow area. The combination of the hydrodynamic pressure pad (unslotted rails 30, 36) and the opposite low clearance air film 62 adjacent slotted rail 34 presents a slider/disk interface condition that is much more forgiving to the passage of airborne particles than the case where very low clearances (and consequently high air film stiffness) exist on both sides of the disk. In the latter case, high velocity contact with particles and the disk 26, which leads to significant head or disk surface damage (head crash), is more probable.

The number, width and placement of the longitudinal pressure relief slots 32, 52 are important factors in influencing the flying height. Perhaps the single most important geometric parameter is the width 58 of a minimum width rail. While it is important for the width of a rail to be narrow (in order to produce low flying height), it is also important for it to be wide enough to develop sufficient hydrodynamic load support so as to avoid slider/disk contact when off-design conditions are encountered.

Figure 1A:
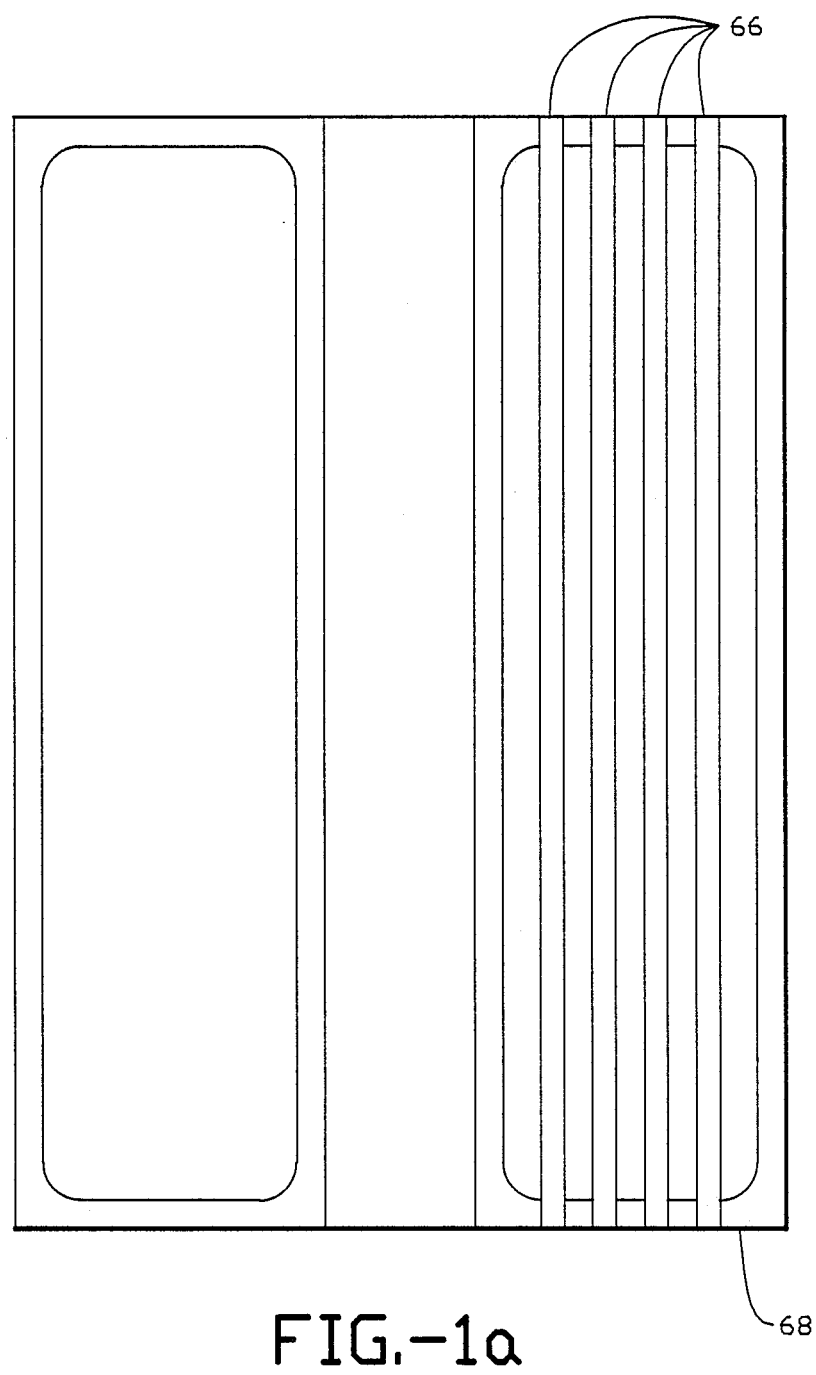
FIG. 1a depicts an alternate embodiment of the head slider of the invention.
Figure 2:
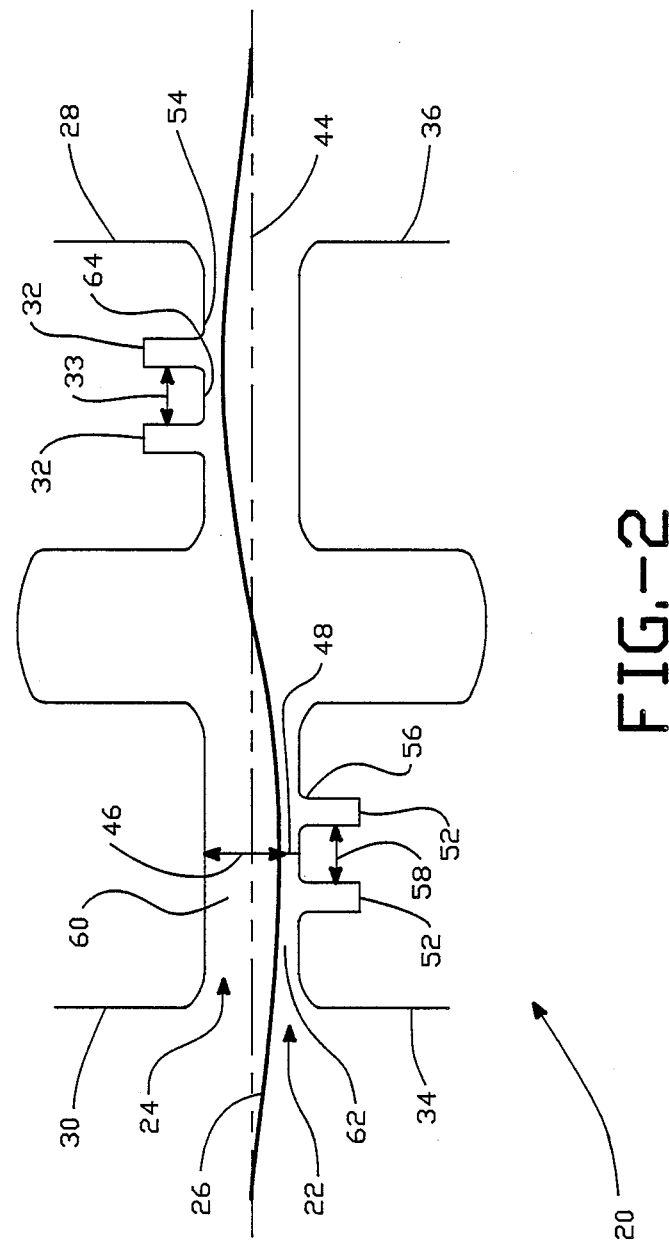
FIG. 2 depicts a cross sectional view of opposed head sliders of the invention, each slider having two rails.
Figure 2A:
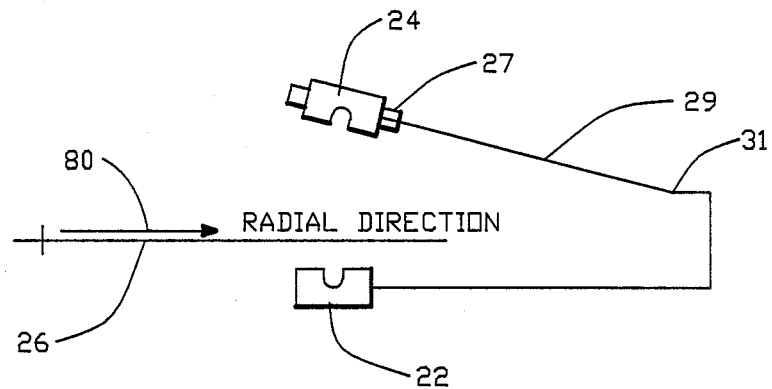
FIG. 2a depicts an end view of the head slider of FIG. 2 positioned in a disk drive.
Figure 2B:
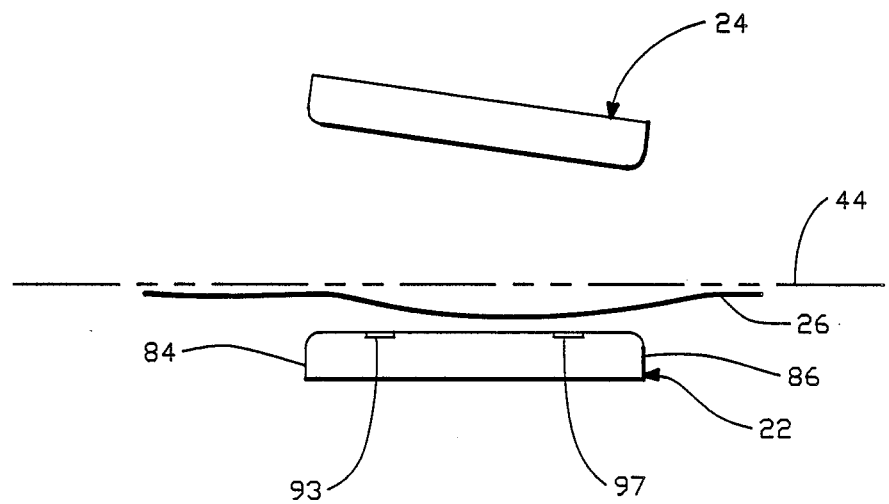
FIG. 2b depicts a side view of the head slider of FIG. 2.

Typically, the preferred embodiment will be configured with two slots 32, one bordering each side edge of a narrow portion 33 of the rail, which portion of the rail contains the magnetic transducer 64 (FIG. 2). An alternative configuration could include a total of four slots 66 (FIG. 1a) to further decrease the flying height or to provide a desired flying height for the case where the transducer rail 68 cannot be made extremely narrow.

Figure 5A:
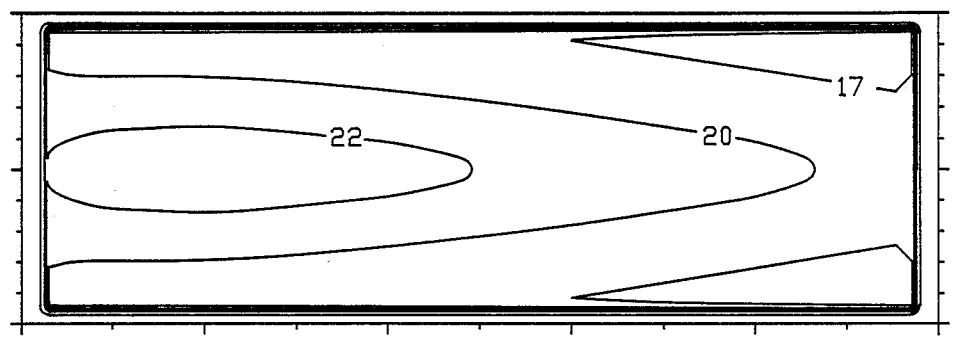
FIGS. 5a and 5b depict top and bottom flying height profiles of a disk relative to a top unslotted rail and a bottom slotted rail.
Figure 5B:
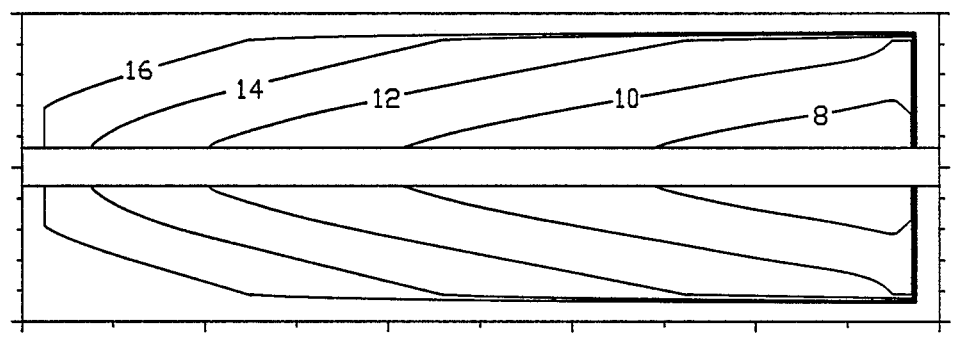
Figure 7A:
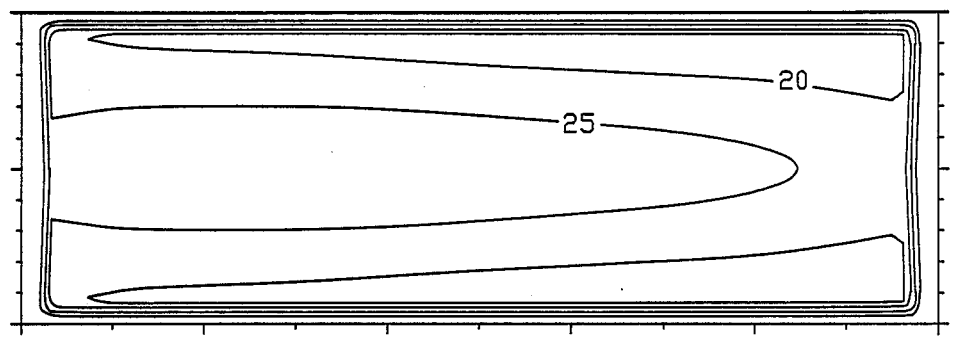
FIGS. 7a and 7b depict the flying heights of a top unslotted and a bottom dual slotted rail relative to a disk.
Figure 7B:
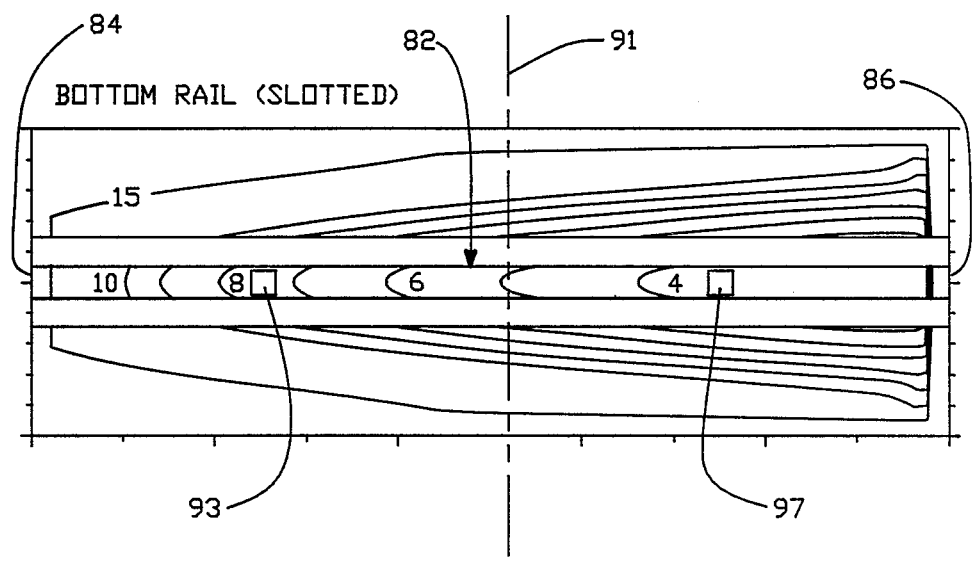

Flying height should ideally decrease from the slider outside edges monotonically toward the transducer region (FIGS. 5, 7), and each magnetic transducer 64 should be located in a region of substantially uniform flying height. This tends to minimize the viscous drag on the disk 26 and also to minimize the flying height sensitivity to manufacturing tolerances. Portions of the air bearing surface of the slider 22, 24 remote from the transducer rail 28, 34 serve to control the disk position at a flying height considerably greater than that at the transducer 64, while the slotted areas effectively decrease the flying height to the levels required for data storage (FIGS. 5, 7).

Industrial Applicability

Figure 3A:
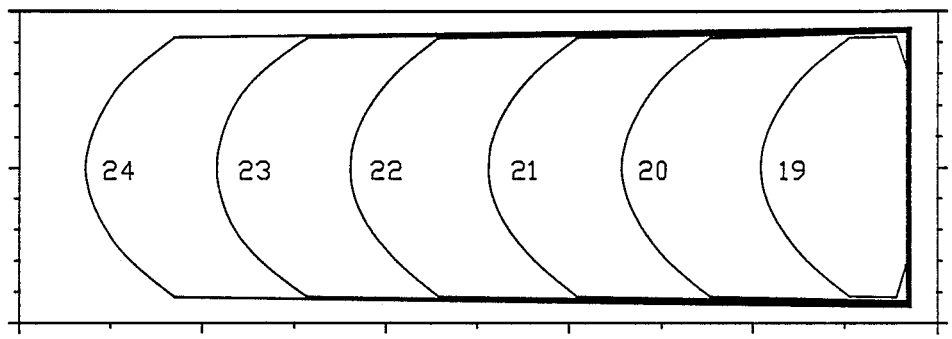
FIGS. 3a and 3b depict the flying height of top and bottom opposed unslotted rails with respect to a interposed disk.
Figure 3B:
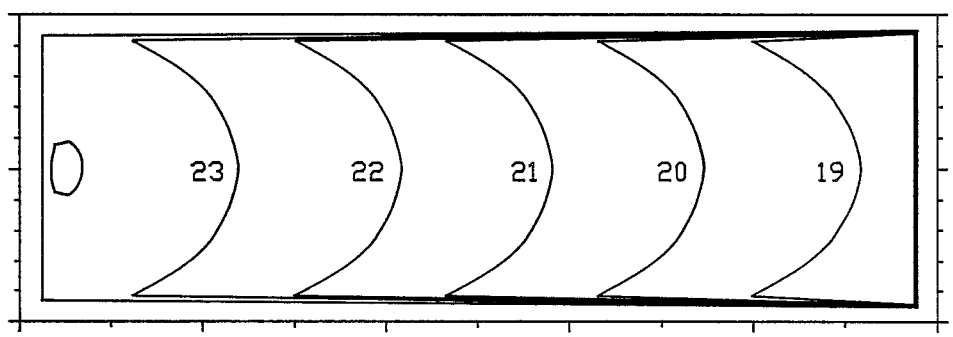
Figure 4A:
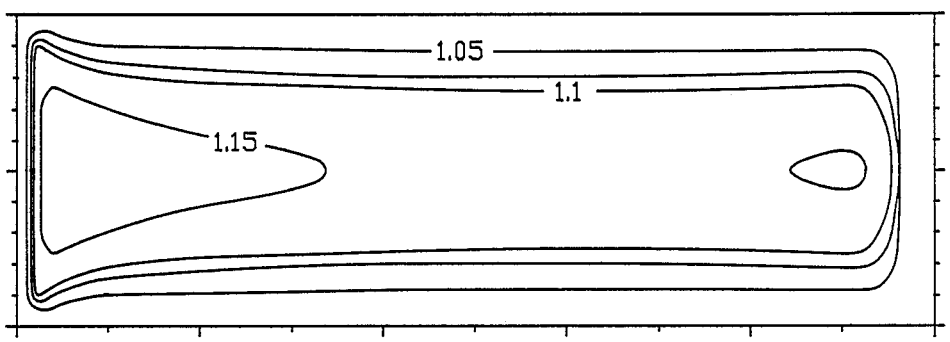
FIGS. 4a and 4b depict the pressure profile of the rails of FIGS. 3a and 3b.
Figure 4B:
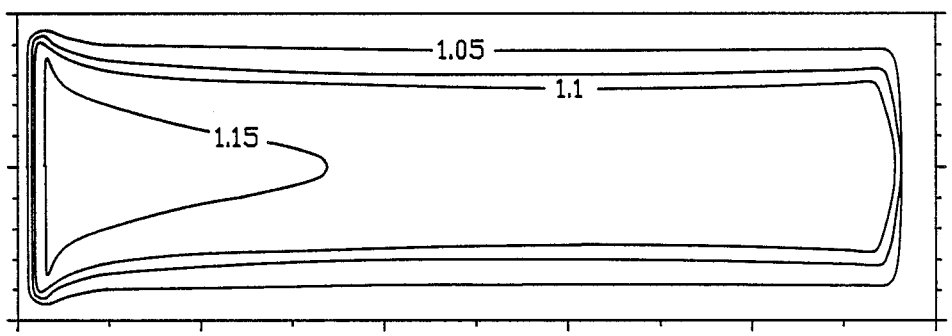

In order to quantitatively demonstrate the influence of a longitudinal ambient pressure slot on the resulting flying height profile of a flexible disk slider, consider an opposed two-rail slider assembly. The bottom slider is fixed and is not penetrated into the disk. The top slider is gimbal mounted to provide three degrees of freedom and is loaded with 9.5 grams force. The slider center is located at a disk radius of 0.91 inch on a 3.5 inch disk and the disk spins at 3000 RPM. The disk substrate material is MYLAR ® and the disk is 0.003 inch thick. Each rail is 0.187 inch long and 0.045 inch wide. Edge blending is 0.004 inch wide with a radius of curvature of 0.2 inch and surrounds each rail. The unslotted slider rail flying height profiles are shown on FIG. 3 and the flying height is seen to be about 21 microinch at the center of each rail. Pressure profiles (in atmospheres of pressure) are shown on FIG. 4 and are seen to be fairly uniform over much of each rail.

Figure 6A:
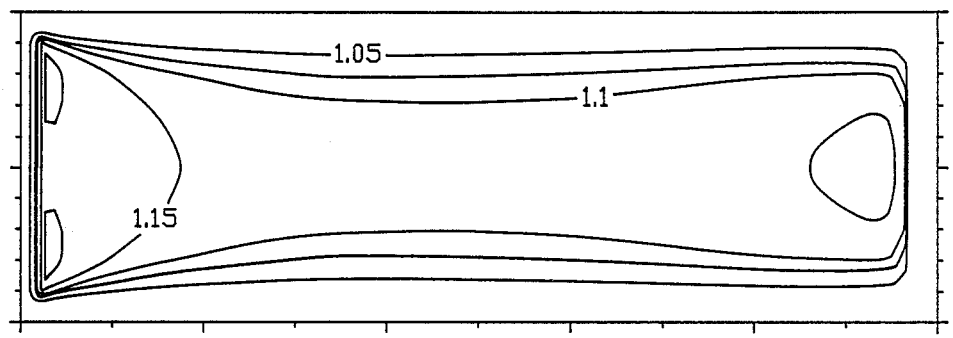
FIGS. 6a and 6b depict pressure profiles for the rails of FIG. 5a and 5b.
Figure 6B:
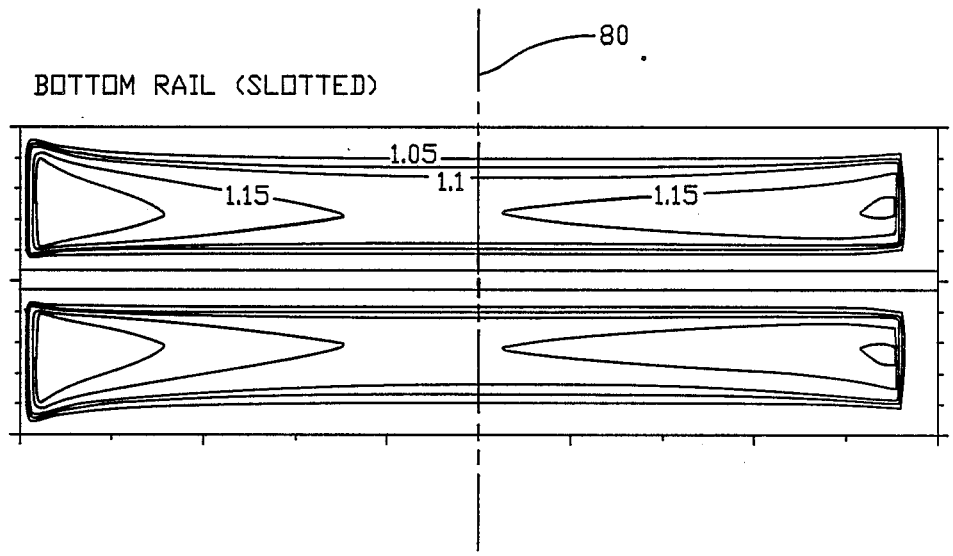

A single slot of width equal to 0.005 inch is then located at the center of one of the bottom rails. Steady-state flying height profiles in microinches are shown on FIG. 5 for the slotted bottom rail and directly opposed top rail. The influence of the single slot causes the slotted rail flying height to decrease to about half the unslotted values. The top rail retains about the same flying height levels as for the previous case. Pressure profiles (in atmospheres of pressure) are shown on FIG. 6. The close proximity of the pressure contours along the side edges of the slotted rail indicate that the air film loses part of its mass due to transverse flow (i.e., along a disk radial line 80). This accounts for the decrease in flying height over the slotted rail. Pressure over the unslotted rail is more uniform. Notice that the flexural properties of the disk are able to support the disk over the slot without contact even though the top side air film pressure (caused by non-slotted HPP) acting on the disk is substantial. The narrow slot allows this, causing the flexible disk to act as a stiff elastic plate over the slot.

Another preferred embodiment of an air bearing configuration encompassing the invention utilizes two longitudinal slots 32 in each rail 28 which contains a magnetic transducer (FIG. 1). The two slots define the border along the side edges of the magnetic transducers 64 and serve to reduce the flying height in the vicinity of the magnetic transducers 64. The rail 36 directly opposite the slotted rail (and on the opposite side of the disk 26) is unslotted and provides to the disk a hydrodynamic pressure pad (HPP) for contributing to a very low clearance over each slotted rail 28. If directly opposite rails were both slotted, several problems would result. First, there would be electrical interference between the magnetic transducers. Second, the required dimensional alignment of the opposed sliders and transducers would be very tight, because each rail would have a complex geometry. Third, the passage of airborne particles through the low clearances of the directly opposed slotted air films would give rise to increased levels of particle contact with the head or disk surface which would reduce the reliability of the head/disk interface. By slotting two off-set top and bottom rails, these three problems are eliminated.

Figure 8A:
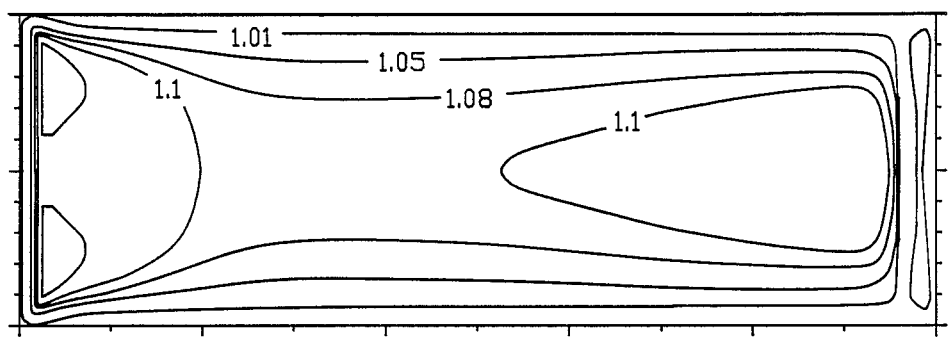
FIGS. 8a and 8b depict a pressure profile of the rails of FIG. 7a and 7b.
Figure 8B:
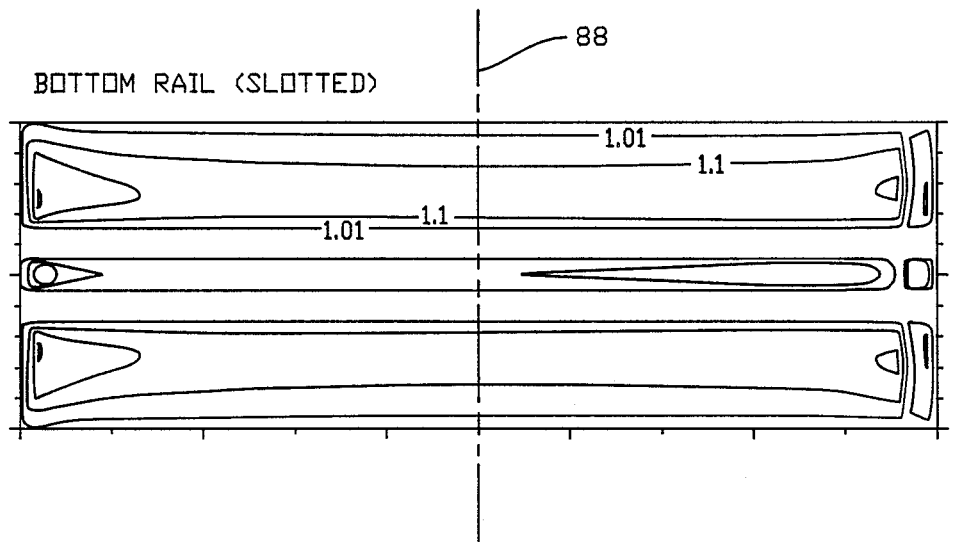

Consider the same overall slider dimensions and operating conditions as were used in the previous case. However, the width of each rail is now 0.054 inch. Two longitudinal slots, each 0.005 inch wide, are located in one of the top rails and in the corresponding off-set opposed rail. The slots define a symmetrically located central air bearing surface (ABS) 82 (FIG. 7) with width of 0.006 inch. The 0.006 inch wide ABS 82 contains the magnetic transducers (a low density transducer 93 located ahead of the slider centerline 91 and a high density transducer 97 located behind centerline 91). Over each slotted rail, the dual slots serve to reduce the flying height monotonically from the rail outer edges to the levels required for data transfer along the narrow central ABS 82 (FIG. 7). Because the loaded upper slider takes on a pitch angle with respect to the disk, the flying height of the slotted rail tends to decrease from leading edge 84 to trailing edge 86 (FIG. 7, 2b). Flying height levels compatible with the requirements of current day magnetic recording are produced over the narrow central ABS 82. The flying height over the unslotted rails is seen to be much higher, in the range of twenty microinches. Pressure contours (FIG. 8) indicate that the relief slots cause substantial transverse air flow (along disk radial line 88) out of the air bearing region and into the slots. The unslotted rail air bearing pressure provides a soft, non-contact, spring-like effect to the disk and operates in conjunction with the slots to reduce the flying height over the magnetic transducer.

Figure 9:
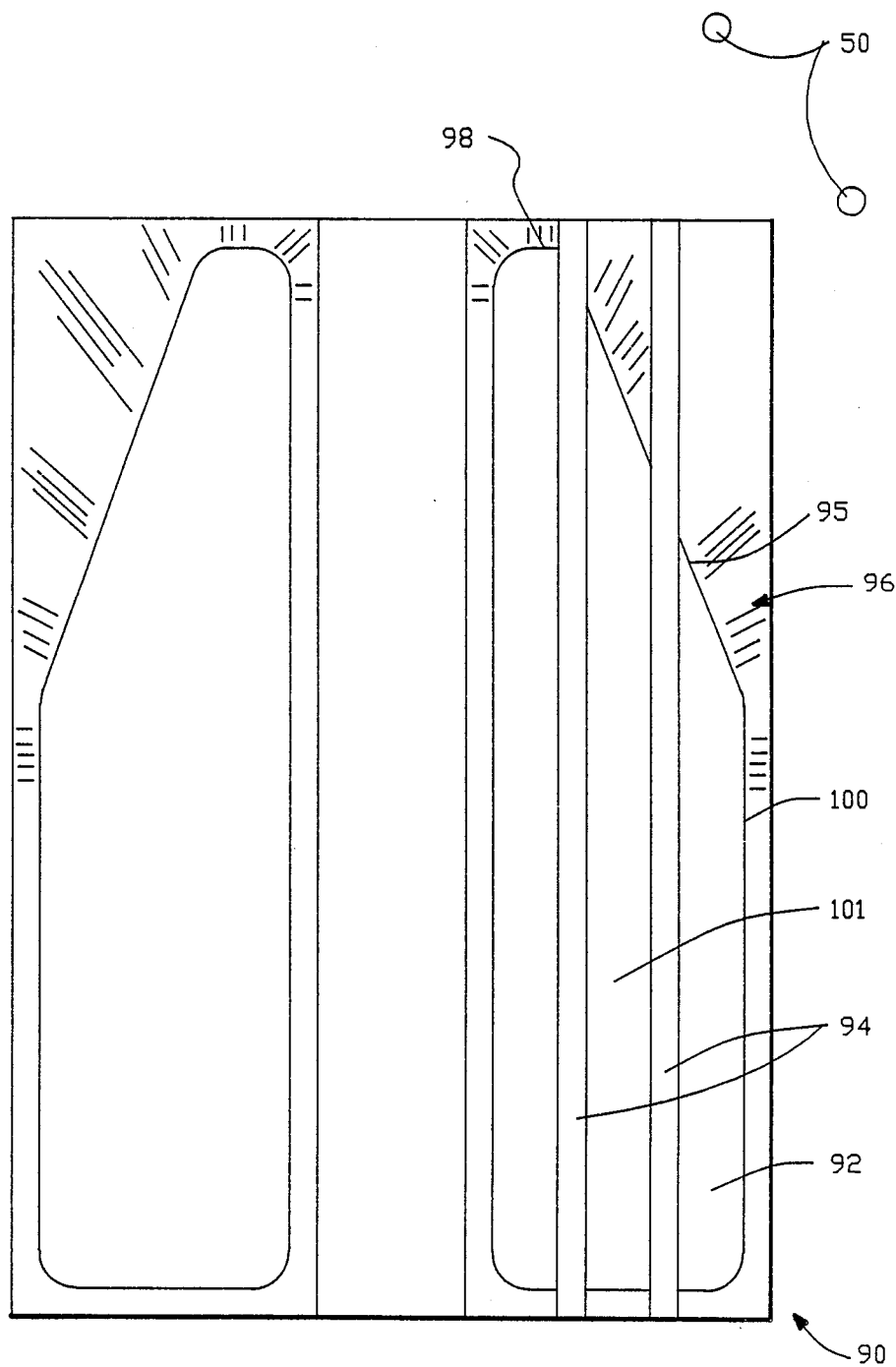
FIG. 9 depicts an alternative embodiment of the slider having a diagonally blended contour.

Still another embodiment 90 (FIG. 9) includes a longitudinally slotted air bearing surface or face ABS 92 with slot 94 together with a diagonally blended contour 96 joining blended sections of front edge 98 and side edge 100 (FIG. 9). The contour 96 is defined by diagonal edge 95. The primary purpose of the diagonally blended contour 96 is to divert the motion of solid particles 50 impinging on the air bearing surface 101 so that a minimum of airborne particles travel through the air film defined by the head/disk interface. This configuration thus increases the reliability of the head/disk interface.

Further, it can be observed that by means of the slots 32 and 52 the width of the slider rails can be larger than demonstrated by prior art sliders and yet achieve low spacings between the medium and the read/write transducers which low spacing could only heretofore be possible with narrow prior art sliders This aspect is especially important during the starting and stopping of the medium rotational speeds when it is important to have wide sliders to reduce contact pressure and minimize wear. The sliders of the present invention will initially be in contact with the medium and during this phase the contact pressure loading on the medium will remain small similar to present low speed floppy drives and thus have minimum wear. As the rotational speed is increased a stable air pressure film will develop between the sliders and the disk to support non-contact operation.

The present invention, unlike a conventional unslotted rail slider, achieves very low flying height through the utilization of a relatively wide slotted rail. The wide rail provides to the slider/disk interface lower contact pressures during start/stop operation due to an increased area of contact.

In the reverse sequence, if the rotational speed of the disk should diminish and stop then the air pressure film will reduce in magnitude until the sliders gently contact the medium over a wide surface area and thus minimize wear.

Still other aspects and objects of the invention can be observed from a review of the figures and appended claims.

It is to be understood that other embodiments of the invention can be fashioned and come within the spirit and scope of the claims.

We claim:

1. A slider arrangement for support of a transducer in operative relation with a flying height relative to a moving medium, comprising:
   a first slider, with a first longitudinal rail mounted relative to a first side of the medium;
   a second slider with a second longitudinal rail mounted relative to a second side of the medium and substantially opposite the first slider;
   a slot means including at least one longitudinal slot located in said first rail of said first slider for allowing the first slider to fly closer to the moving medium than the second slider.

2. The slider arrangement of claim 1 wherein:
   said slot means includes two longitudinal slots located in said first rail.

3. The slider arrangement of claim 1 wherein:
   said rails define faces which are substantially flat and said rails define edges which are contoured;
   wherein the slot means is located in the face of the first rail.

4. The slider arrangement of claim 1 wherein:
   a face of the rail of at least one of the sliders has a small amount of curvature in the longitudinal direction so as to make the face of the rail somewhat convex relative to the medium.

5. The slider arrangement of claim 1 wherein:
   said first rail includes a leading edge and a side edge and a diagonal edge joining the leading edge with the side edge.

6. The arrangement of claim 1 including a read/write transducer located in the first slider with said slot means.

7. The slider arrangement of claim 1 wherein:
   said slot means includes two longitudinal slots located in said first rail with the transducer located between said slots.

8. The slider arrangement of claim 1 wherein the slot has a width of about the thickness of the medium to several times the thickness of the medium.

9. The slider arrangement of claim 1 wherein:
   the width of the first rail and the second rail is sufficient to allow contact start and stop operation with minimal wear of the medium.

10. The slider arrangement of claim 1 wherein the slot has a width of up to several times the thickness of the medium.

11. A self adjusting slider arrangement for support of a read and/or write transducer in operative relation to first and second sides of a moving medium, said self adjusting slider arrangement comprising:
    a first slider, with a first longitudinal rail and a second longitudinal rail, each of said first and second longitudinal rails defining a face positioned toward the first side of the medium;
    a second slider, with a third longitudinal rail and a fourth longitudinal rail, each of said third and fourth longitudinal rails defining a face positioned toward the second side of the medium;
    means for mounting said second slider relative to the medium and substantially opposite the first slider, such that the second slider is movable towards and away from the medium and for urging the second slider toward the medium;
    at least one longitudinal air being slot located in only one rail of each of said first and second sliders, with the slotted rails of each slider directly opposite the rails without slots of the other slider;
    such that an air film over each rail without a slot acts as a hydrodynamic pressure pad to urge the medium towards each opposed rail with the slots, with the slots serving to bleed off a portion of a pressurized air film located between the medium and the rails with slots, so as to produce a very low clearance flying height between the rails with slots and the medium.

12. The slider arrangement of claim 11 wherein each slot has a width of about the thickness of the medium to several times the thickness of the medium.

13. The slider arrangement of claim 11 includes:
    a low density transducer located ahead of a centerline of each rail with the longitudinal air bearing slot;
    a high density transducer located behind the centerline of each rail with the longitudinal air bearing slot;
    wherein the flying height of the low density transducer above the medium is greater than the flying height of the high density transducer above the medium.

14. The slider arrangement of claim 11 wherein:
    said air film adjacent the rails with the slot is stiffer than the air film adjacent the rails without the slot.

15. The slider arrangement of claim 11 wherein:
    two longitudinal slots are located in one of said rails of each slider, with the slotted rail of each slider positioned opposite the rail without the slots of the other slider.

16. The slider assembly of claim 11, wherein:
    the faces of the rails of at least one of the sliders has a small amount of curvature in the longitudinal direction so as to make the faces of the rails somewhat convex relative to the medium.

17. The slider arrangement of claim 11 wherein:
    said first and second rails each include a leading edge and a side edge;
    said first rail further including a first diagonal edge joining the leading edge with the side edge of the first rail;
    said second rail further including a second diagonal edge joining the leading edge with the side edge of the second rail;
    wherein said first and second diagonal edges are directed substantially away from each other and outwardly of the first slider.

18. The slider arrangement of claim 11 wherein:
    two longitudinal slots are located in one of said rails of each slider with the transducer located between said slots.

19. The slider arrangement of claim 11 including:
    two longitudinal slots located in one of said rail of each slider;
    a first low density transducer located between said slot and located ahead of the centerline of the rails with said two longitudinal slots;
    a second high density transducer located between said slots and located behind the centerline of the rails with the two longitudinal slots.

20. The slider arrangement of claim 11 wherein:
the first, second, third and fourth rails have a leading edge and an outer side edge; and
diagonal edges joining the leading edges to the outer side edges of each said rail.

21. The slider arrangement of claim 14 including:
two longitudinal slots located in one of said rails; and
a first low density transducer and a second high density transducer, both located between said slots.

22. The slider arrangement of claim 11 wherein:
the first and second rails have a leading edge and an outer side edge; and
diagonal edges joining the leading edges to the outer side edges of each said rail.

23. The slider arrangement of claim 11 wherein:
the width of the first rail and the second rail is sufficient to allow contact start and stop operation with minimal wear of the medium.

24. The slider arrangement of claim 11 wherein each slot has a width up to several times the thickness of the medium.

25. A self adjusting slider arrangement for support of a read and/or write transducer in operative relationship with a flying height relative to a moving flexible medium which medium has a first side and a second side, said self adjusting slider arrangement comprising:
a first slider, with a first longitudinal rail;
first means for mounting said first rail relative to the first side of the medium;
a second slider with a second longitudinal rail;
second means for mounting said second rail relative to the second side of the medium and directly opposite the first rail;
said second means for mounting including means for enabling the second slider to move toward and away from the medium and for urging the second rail toward the medium;
such that the movement of the medium and the proximity of the first and second sliders with the medium causes air films between the first slider and the medium, and between second slider and the medium to be pressurized so that a non-contact condition exists between said sliders and the medium;
at least one longitudinal air bearing slot located in only one of said first and second rails such that the air film adjacent to the rail without a slot acts as a hydrodynamic pressure pad in urging the medium toward the rail with the slot, with the slot serving to bleed off a portion of the pressurized air film adjacent said slot, producing a very low clearance flying height between the rail with a slot and the medium.

26. The slider arrangement of claim 25 wherein:
two longitudinal slots are located in one of said rails.

27. The slider arrangement of claim 8 wherein:
a face of a rail of at least one of the sliders has a small amount of curvature in the longitudinal direction so as to make the face of the rail somewhat convex relative to the medium.

28. The slider arrangement of claim 25 wherein:
said first rail includes a leading edge and a side edge and a diagonal edge joining the leading edge with the side edge.

29. The slider arrangement of claim 25 wherein:
two longitudinal slots are located in one of said rails with the transducer located between said slots.

30. The slider arrangement of claim 25 including:
two longitudinal slots located in one of said rails;
a first low density transducer located between said slots and ahead of the centerline of the rail with said two longitudinal slots;
a second high density transducer located between said slots, and behind the centerline of the rail with the two longitudinal slots.

31. The slider arrangement of claim 25 wherein the slot has a width of about the thickness of the medium to several times the thickness of the medium.

32. The slider arrangement of claim 25 including:
low density transducer located ahead of a centerline of the rail with the longitudinal air bearing slot;
a high density transducer located behind the centerline of the rail with the longitudinal air bearing slot;
wherein the flying height of the low density transducer above the medium is greater than the flying height of the high density transducer above the medium.

33. The slider arrangement of claim 25 wherein:
said air film adjacent the slider with the slot is stiffer than the air film adjacent the slider without the slot.

34. The slider arrangement of claim 25 including;
two longitudinal slots located in one of said rails; and
a first low density transducer and a second high density transducer, both located between said slots.

35. The slider arrangement of claim 25 wherein the slot has a width up to several times the thickness of the medium.

36. The slider arrangement of claim 25 wherein:
the width of the first rail and the second rail is sufficient to allow contact start and stop operation with minimal wear of the medium.

* * * * *